July 7, 1970 H. R. HAWLEY 3,519,165

CUP STACKING MEANS

Filed March 17, 1969

INVENTOR.
HARRY R. HAWLEY

BY

ATTORNEY

United States Patent Office 3,519,165
Patented July 7, 1970

3,519,165
CUP STACKING MEANS
Harry R. Hawley, Lombard, Ill., assignor to American Can Company, New York, N.Y., a corporation of New Jersey
Filed Mar. 17, 1969, Ser. No. 807,600
Int. Cl. B65d *21/00*
U.S. Cl. 220—97                     5 Claims

ABSTRACT OF THE DISCLOSURE

A nestable container has a stacking shoulder having a wavy configuration which is more conducive to flexure, thereby enabling a stack of nested cups to absorb greater shock loading. The wavy configuration also provides an air vent space which facilitates release of two nested cups.

BACKGROUND OF THE INVENTION

This invention relates to containers such as cups or the like and more particularly to a new and improved stacking device to improve the nesting characteristics of the containers.

The market for disposable containers made of plastic has experienced rapid growth, and today disposable plastic containers are used for serving hot and cold foods and beverages both in automatic vending machines and in restaurants of all types. As economy and convenience are important factors in the use of plastic disposable containers, it is essential that shipping costs of such containers by minimized and damage during shipping be eliminated. Economy and convenience also require that a large number of containers be capable of being stored in a relatively small volume so as not to occupy excessive space.

To conserve space in storage, plastic containers are designed to nest close to one another. When they are nested close to one another, a stack of cups subjected to an impact load is compressed. Many of the cups in the column bind so tightly upon adjacent cups that they are damaged or they cannot be separated except with great effort, and they are often discarded or used in pairs by vendors. When cups designed for use in vending machines are so compressed and locked within one another, they cannot be automatically dispensed one at a time in the machine and, therefore, not only create waste by being discharged in pairs but often jam the machine as well. In vending machines and in many automatic packaging machines which use disposable plastic cups, the lowermost container in a nested stack is dispensed by gravity one at a time to a location where it is filled with the food or beverage, and in order for the machines to operate properly, the cups must not stick together.

One object of this invention is to provide a stacking device in the wall of a container which facilitates container separation from a nested stock of like containers and which increases the resiliency of the stack of nested containers.

SUMMARY OF THE INVENTION

A nestable container of plastic or like material has a stacking means in the side wall thereof comprising an internal shoulder longitudinally spaced from an external shoulder. One of the shoulders has a wavy configuration which is more conducive to flexure, thereby enabling a stack of nested cups to absorb greater shock loading. In addition, the wavy configuration provides an air vent space which facilitates release of two nested cups and permits free circulation of air between two nested cups.

DESCRIPTION OF THE PREFERRED EMBODIMENT

Figure 1:
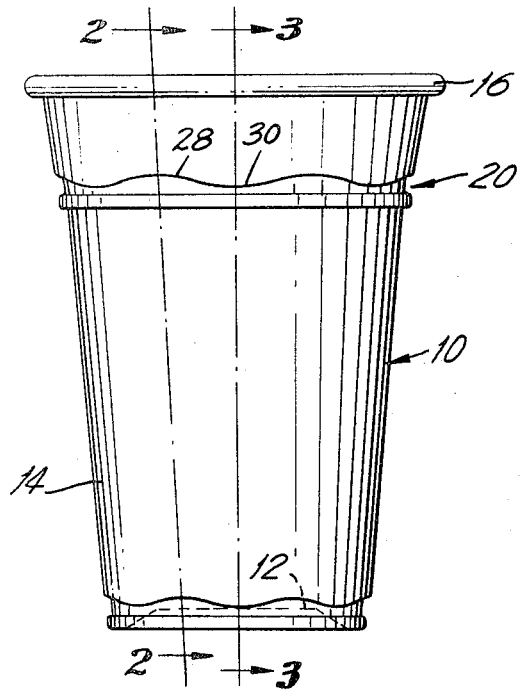
FIG. 1 is a side view of a cup constructed in accordance with the principles of this invention.

The cup hereinafter described is made of plastic, preferably of high impact polystyrene. Such cups have advantages over paper cups which have been impregnated or coated with wax. The plastic cups present a better feel and taste to the lips, they do not become soggy in use, and they form a better vapor barrier.

The cup is formed or molded from sheet plastic material and is designated by the numeral 10. The cup comprises a preferably indented bottom 12 with a side wall 14 integral therewith. The side wall 14 is frusto-conical in configuration, tapering out from a minimum diameter at the bottom to an open upper end defined by a rolled-over rim 16. The side wall 14 is for the most part smooth and has a uniform taper. However, it will be understood that the side wall may have irregularities or other configurations.

Adjacent the top or open upper end of the container 10 and spaced downwards a relatively short distance therefrom there is provided a stacking means 20. The stacking means 20 comprises an internal shoulder 22 which extends inwardly from the side wall 14 and an external shoulder 24 which extends outwardly from the side wall 14. The two shoulders 22, 24 circumscribe the containers. The internal shoulder 22 is located above the external shoulder 24 and is joined to the latter by a circumscribing portion 26.

Figure 2:
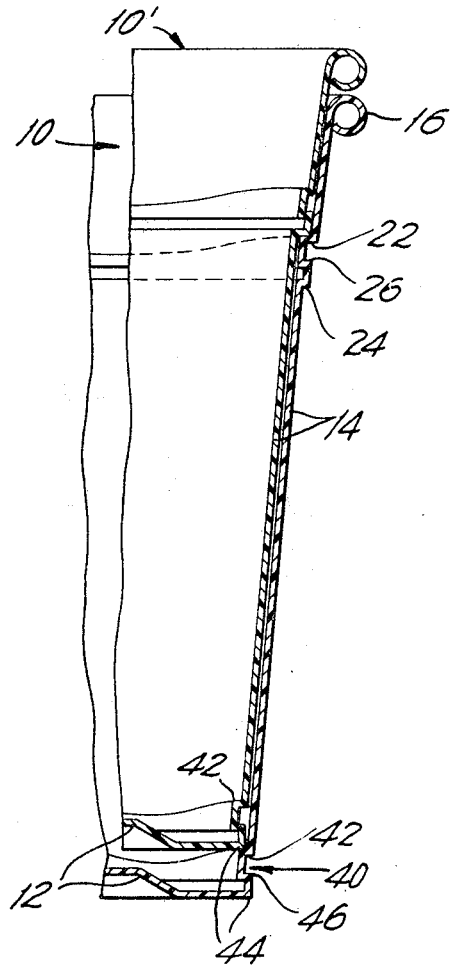
FIG. 2 is an axial sectional view on an enlarged scale showing a pair of cups of FIG. 1 stacked together in telescoped relation, said section being taken at a location corresponding substantially to line 2—2 of FIG. 1.
Figure 3:
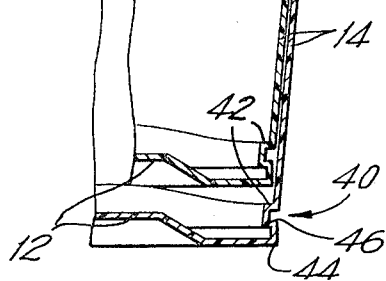
FIG. 3 is a view similar to FIG. 2 but taken at a location corresponding substantially to line 3—3 in FIG. 1.

The internal shoulder 22 has a generally wavy surface which undulates in that it rises and falls in the direction of the longitudinal axis of the container, said surface being continuous and taking the form of a sine wave as it circumscribes the cup 10. The external shoulder 24, on the other hand, is a circumscribing surface which does not undulate but which is a generally flat, horizontal surface. The shoulders 22, 24 are sized and proportioned so that the external shoulder 24 of one of a pair of nested cups engages the internal shoulder 22 of the other of said pair of nested cups, said engagement being made along circumferentially spaced locations where the high points of the wavy surface on the outer cup engage the flat horizontal surface of the external shoulder 24 on the inner cup. One of the high points of the wavy surface is indicated by the numeral 28 in FIG. 1, and it will be seen that FIG. 2 is a section taken through such high point 28 so that the external shoulder 24 of the inner cup 10¹ in FIG. 2 is shown contacting the internal shoulder 22 of the outer cup 10. It will be apparent that with the high points (e.g. 28) of the internal shoulder 22 contacting the flat surface of the external shoulder 24 of two like nested cups, that the low points of the wavy surface of the internal shoulder 22 of an outer cup will be spaced from the flat surface of the external shoulder of an inner cup of two like nested cups 10, 10'. One of the low points of the wavy surface is indicated by the numeral 30 in FIG. 1 and it will be seen that FIG. 3 is a section taken through said low point 30 so that the external shoulder 24 of the inner cup 10' in FIG. 3 is shown spaced from the internal shoulder 22 of the outer cup 10.

The stacking means in utilizing a wavy shoulder provides resiliency in a nested stack of cups in that there is inherent resiliency in the wavy structure and in the plastic material from which the cups are made. It will be apparent that the circumferentially spaced contact points between the shoulders 22, 24 of the two nested cups affords a structure more conducive to flexure because there is space between the circumferentially spaced contact points in which the plastic material can flex. With improved stack resiliency, a stack has the capability to absorb greater shock loading thereby making it possible to ship such stack with all the normal roughness of handling and then to load the stack into a vending machine without developing double cups, telescoping, or otherwise damaging the cups. In addition, the space between the contact points of the shoulders of two nested cups provides an air vent space which facilitates release of two nested cups and permits free circulation of air between two nested cups. This construction permits the equilibration of air pressure, eliminates air entrapment between the cups, and is an improvement over a straight shoulder design which tends to cause multiple cup dispensing or undesirable hesitation in cup separation by imposing a partial vacuum between cups.

Cups having sinuous and non-sinuous, flat stacking shoulders were evaluated for resistance to telescoping when dropped. The drop test was conducted using a stack of 100 cups of each type. Each stack was dropped once at each height, flat on the bottom.

Following are the results of the drop test:

| | Doubles produced (sets) | |
|---|---|---|
| Drop height (feet) | #1 non-sinuous flat design | #2 sinuous design |
| 2 | 0 | 0 |
| 2½ | 0 | 0 |
| 3 | 0 | 0 |
| 3½ | 0 | 0 |
| 4 | 2 | 0 |
| 4½ | 3 | 0 |
| 5 | 2 | 0 |
| 5½ | 4 | 0 |
| Total | 11 | 0 |

It was found that the sinuous shoulder produced a stacking feature which acted much like a spring. The stack of cups compressed when exposed to the impact, but separated when the force of the impact was removed. Each cup in the stack has the ability to compress slightly before actually telescoping and thus absorbs the shock of the impact.

In another test, a stack of 10 nested cups were mounted brim down on a platform fixed to a movable crosshead of a tensile test machine. A string was fixed by adhesive to the middle of the base of the top inverted cup and connected to the load cell of the tensile test machine. Movement of the crosshead at programmed speeds facilitated the separation of the top cup from the stack. A packing force consisting of a 100 gram weight was used to pack each stack at four points on the base of the top cup before each test. Following are the results obtained:

| Crosshead movement (speed of separation), inches/minute | Separation load, plastic cup with straight [1] stacking shoulder (grams) | Separate load, plastic cup with sinuous stacking shoulder (grams) |
|---|---|---|
| 20 | 33.2 | 17.8 |
| 10 | 36.4 | 13.5 |
| 5 | 29.2 | 11.0 |
| 2 | 24.3 | 9.5 |
| 1 | 21.0 | 7.3 |

[1] Exhibited multiple cup removal.

The possibility of a partial vacuum between nested cups with straight stacking shoulders was explored. When the base of such a cup was perforated, the resultant air hole apparently eliminated the suctional force. Under this condition, the tensile loads for cup removal were reduced approximately three-fold, and multiple cup removal in the test was eliminated.

In the illustrated embodiment, a second stacking means 40 similar to the stacking means 20, previously described, is provided at the bottom of the cup 20. The stacking means 40 comprises an internal shoulder 42 which extends inwardly from the side wall 14 and an external shoulder 44, the latter defining the bottom corner of the cup and being joined to the internal shoulder 42 by the side wall portion 46.

The internal shoulder 42 is similar to internal shoulder 22 previously described, in that it has a generally wavy surface which undulates in the direction of the longitudinal axis of the container. The external shoulder 44 is a circumscribing surface which is generally flat and defines the outer circumscribing periphery of the cup bottom. The shoulders 42, 44 are sized and proportioned so that the external shoulder 44 of one of a pair of nested cups engages the internal shoulder 42 of the other said pair of nested cups, said engagement being made along circumferentially spaced locations as previously described.

It will be seen that FIG. 2 is a section taken through a high point of the internal shoulder 42 so that the external shoulder 44 of the inner cup 10' in FIG. 2 is shown contacting the internal shoulder 42 of the outer cup 10. It will be apparent that with the high points of internal shoulder 42 contacting the flat surface of the external shoulder 44 of two like nested cups, that the low points of the wavy surface of internal shoulder 42 will be spaced from the flat surface of the external shoulder 44 of the two like nested cups. It will be seen that FIG. 3 is a section taken through a low point so that the external shoulder 44 of the inner cup 10' in FIG. 3 is shown spaced from the internal shoulder 42 of the outer cup 10.

It will be apparent that the stacking means 40 affords the same benefits as the stacking means 20 in being more conducive to flexure and providing an air vent space to facilitate release of the two nested cups.

Although the cups in the illustrated embodiment each have two stacking means 20 and 40, it will be understood that either one of the stacking means 20 or 40 may be used without the other.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A thin walled plastic container having stacking means facilitating separation of a single cup from a stack of nested cups, comprising:
    a frusto-conical body having an integral bottom and a rolled rim surrounding the open opposite end;
    longitudinally spaced upper and lower stacking shoulders in the side wall of said body below said rim one of said shoulders being external and the other internal, the outside diameter of said external shoulder being greater than the outside diameter of said internal shoulder;
    a circumscribing portion in said sidewall separating said upper and lower stacking shoulders;
    one of said shoulders being defined by a continuous circumscribing resilient surface which rises and falls in the direction of the longitudinal axis of said container;
    and said other shoulder being a substantially horizontal continuous circumscribing flat surface such that said external shoulder is adapted to support the bottom surface of said external shoulder of a second nested cup whereby said rising and falling surface of said one shoulder engages said flat surface of said other shoulder of another nested container at circumferentially spaced points enabling the stacking means to flex in a longitudinal direction when an axial load is applied.

2. The container of claim 1 wherein said external shoulder is said substantially horizontal continuous circumscribing flat surface.

3. A plastic container according to claim 1 wherein said continuous, circumscribing surface is sinuous.

4. A plastic container according to claim 1 further comprising a second stacking means in said side wall adjacent said bottom wall.

5. A plastic container according to claim 1 wherein circumferentially spaced air vent spaces are provided between two nested containers, said air vent spaces being located where the shoulders of two nested cups are out of contact with one another.

References Cited

UNITED STATES PATENTS 2,239,093    4/1941    Giller.
3,223,305   12/1965    Edwards.

GEORGE E. LOWRANCE, Primary Examiner

U.S. Cl. X.R.

229—1.5; D44—9